(12) United States Patent
Stroud (10) Patent No.: US 7,508,344 B2
(45) Date of Patent: Mar. 24, 2009

(54) SYSTEMS AND METHODS FOR TDOA/FDOA LOCATION

(75) Inventor: Ken A. Stroud, Greenville, TX (US)

(73) Assignee: L-3 Communications Integrated Systems, LP, Greenville, TX (US)

( * ) Notice: Subject to any disclaimer, the term of this patent is extended or adjusted under 35 U.S.C. 154(b) by 231 days.

(21) Appl. No.: 11/288,975

(22) Filed: Nov. 29, 2005

(65) Prior Publication Data

US 2007/0120738 A1 May 31, 2007

(51) Int. Cl.
*G01S 1/24* (2006.01)

(52) U.S. Cl. .................................................. 342/387

(58) Field of Classification Search ................ 342/387, 342/444, 446, 449
See application file for complete search history.

(56) References Cited

U.S. PATENT DOCUMENTS

| 4,433,335 | A | | 2/1984 | Wind |
| 5,008,679 | A | | 4/1991 | Effland et al. |
| 5,317,323 | A | | 5/1994 | Kennedy et al. |
| 5,327,144 | A | | 7/1994 | Stilp et al. |
| 5,406,291 | A | | 4/1995 | Guerci et al. |
| 5,570,096 | A | | 10/1996 | Knight et al. |
| 5,570,099 | A | | 10/1996 | DesJardins |
| 5,608,410 | A | | 3/1997 | Stilp et al. |
| 5,914,687 | A | | 6/1999 | Rose |
| 6,018,312 | A | * | 1/2000 | Haworth ................ 342/353 |
| 6,255,992 | B1 | * | 7/2001 | Madden ................ 342/424 |
| 6,407,703 | B1 | | 6/2002 | Minter et al. |
| 6,618,009 | B2 | | 9/2003 | Griffin et al. |
| 6,665,332 | B1 | | 12/2003 | Carlson et al. |
| 6,677,893 | B2 | | 1/2004 | Rideout et al. |
| 6,734,824 | B2 | | 5/2004 | Herman |
| 6,853,629 | B2 | | 2/2005 | Alamouti et al. |
| 2004/0027276 | A1 | * | 2/2004 | Herman ................ 342/181 |
| 2005/0151093 | A1 | | 7/2005 | Zaugg |

OTHER PUBLICATIONS

Gustafsson et al., "Positioning Using Time-Difference Of Arrival Measurements", This Reference Was Available Prior To The Filing Date Of The Present Application, 4 pgs.
Stilp, Apr. 1, 1997, 2 pgs.
"Guardrail Common Sensor", http://www.globalsecurity.org/intell/systems/guardrail.htm, Printed From Internet Feb. 16, 2005, 11 pgs.
"Basis Of Issue Plan-BOIP", Airborne Relay Facility, http://www.fas.org/irp/program/collect/docs/bnM050AE.htm, Printed From Internet Feb. 15, 2005, 2 pgs.
Stein, "Algorithms For Ambiguity Function Processing", IEEE Transactions On Acoustics, Speech And Signal Processing, vol. ASSP-29, No. 3, Jun. 1981, pp. 588-599.
International Search Report, PCT/US06/45157, LCOM:031PCT, Sep. 26, 2007, 3 pgs.

* cited by examiner

*Primary Examiner*—Thomas H Tarcza
*Assistant Examiner*—Nga X Nguyen
(74) *Attorney, Agent, or Firm*—O'Keefe, Egan, Peterman & Enders LLP (57) ABSTRACT

Systems and methods that may be implemented to determine the location of an emitter of electromagnetic radiation, such as an RF signal emitter having an unknown location, using at least two electromagnetic radiation sensor antennas that are co-located on a single sensing platform in combination with at least one other electromagnetic radiation sensor antenna located on another sensing platform.

15 Claims, 5 Drawing Sheets

SYSTEMS AND METHODS FOR TDOA/FDOA LOCATION

BACKGROUND OF THE INVENTION

1. Field of the Invention

This invention relates generally to location of emitters of electromagnetic radiation, and in one example, to Time Difference of Arrival ("TDOA")/Frequency Difference of Arrival ("FDOA") location of emitters of electromagnetic radiation.

2. Description of the Related Art

TDOA/FDOA techniques have been employed in the past to determine the location of emitters of electromagnetic radiation, such as radio frequency ("RF") emissions. Using such techniques, the time difference (TDOA) in reception of a radio signal received at the sensing platforms of two spaced apart aircraft may be used to define a hyperboloid upon which the RF emitter of interest is located. Frequency difference (FDOA) in reception of the same radio signal at the sensing platforms of the two spaced apart aircraft may be generated by flying the spaced apart aircraft at different velocities and headings relative to the RF emitter, and may be used to further resolve the geo-location of the radio emitter. In this regard, assuming that the RF emitter of interest is located on the surface of the earth, the intersection of the TDOA hyperboloid, the FDOA surface, and the surface of the earth may be employed to determine a set of possible geo-locations for the RF emitter. However, only one of these possible geo-locations is real, the other possible geo-locations in the set are purely mathematical solutions that are not the real location of the radio emitter. To determine the correct geo-location requires additional information. In the past, this additional information has been obtained from a system that can produce a line of bearing, from a third aircraft that can measure an independent TDOA/FDOA set of data, or by repositioning the two aircraft and then measuring a second TDOA/FDOA set of data.

Where rapid emitter location determination is desired, past techniques have often employed three aircraft as multiple moving sensing platforms that receive RF signals from an RF emitter of unknown location. Using three aircraft allows the location of an RF emitter to be quickly determined based on a single measurement of time of arrival and frequency (Doppler) shift differences in RF signals received from the RF emitter at each of the three moving aircraft, without the need for repositioning of the three aircraft for subsequent measurement of RF signals received from the RF emitter. However, the necessity for utilizing a third aircraft increases operation costs and complexity.

Two aircraft have been employed as moving sensing platforms where sufficient time exists for measuring more than one set of TDOA/FDOA data from the RF emitter. This has been done by measuring a first set of TDOA/FDOA data at a first set of locations of the two aircraft followed by flying the two aircraft to a second set of locations and measuring a second set of TDOA/FDOA data at the second and new aircraft locations. The recomputed set of TDOA/FDOA data from the second set of aircraft locations may then be compared to the set of TDOA/FDOA data computed at the first set of aircraft locations to obtain a single overlapping answer for the geo-location of the emitter. However, where the RF signal emitter is only transmitting intermittently or only active for a short period of time, there may not be sufficient time to reposition the two aircraft for making subsequent TDOA/FDOA measurements.

Two aircraft may also be employed as moving sensing platforms in combination with additional equipment that is capable of generating a line of bearing, i.e., Inertial Navigation System (INS)/Global Positioning System (GPS) equipment, precision time reference equipment, and data link equipment. While such a technique allows the location of a RF signal emitter to be determined by measuring a set of TDOA/FDOA data at a single position of the two aircraft, it requires additional costs and complexity associated with the line of bearing equipment.

SUMMARY OF THE INVENTION

Disclosed herein are systems and methods that may be implemented to determine the location of an emitter of electromagnetic radiation (e.g., RF signal emitter, visible light spectrum emitter, etc.) having an unknown location, using at least two electromagnetic radiation sensors co-located on a single sensing platform in combination with at least one other electromagnetic radiation sensor on another sensing platform. In the practice of the disclosed systems and methods, a coherent electromagnetic radiation sensor may be co-located with another electromagnetic radiation sensor on a common sensing platform and employed to provide an independent set of TDOA data that is used in the determination of the geo-location of the radio emitter.

In one exemplary embodiment, the disclosed systems and methods may be implemented in a manner that resolves the mathematical ambiguities in calculating a geo-location solution for a short up time emitter using TDOA/FDOA information measured from two sensing platforms (e.g., two aircraft) without the need for taking time to reposition the two sensing platforms to new locations for measurement of additional TDOA/FDOA information. The disclosed systems and methods may be further implemented using this measured TDOA/FDOA information to determine the geo-location of an electromagnetic signal emitter, without the need for obtaining line of bearing information or requiring that additional information be collected by a third sensing platform (e.g., an additional or third aircraft).

The disclosed systems and methods may therefore be advantageously implemented to locate electromagnetic signal emitters of unknown location without the operational costs associated with a third sensing platform, without the expensive equipment costs of a system that can produce a line of bearing, and without requiring time to reposition the sensing platforms. This translates to lower costs and reduced operational complexity as compared to conventional TDOA/FDOA emitter location methods. Furthermore, the disclosed systems and methods may be implemented using sensor circuitry, sensor, and sensing platform equipment specifically designed and manufactured for emitter geo-location operations using co-located sensors, or may be implemented using existing geo-location system equipment, e.g., by retrofitting a sensing platform of an existing system (e.g., Guardrail Common Sensor system) with co-located sensors.

In one respect, disclosed herein is a method of processing electromagnetic radiation, including: receiving the electromagnetic radiation at a first position, the first position being located on a first sensing platform; receiving the electromagnetic radiation at a second position and at a third position, the second and third positions being co-located in spaced relationship on a second sensing platform; and at least one of: measuring time difference of arrival (TDOA) information for the electromagnetic radiation between the first position and the second position, or measuring TDOA information for the electromagnetic radiation between the second position and the third position, or measuring TDOA information for the electromagnetic radiation between the first position and the third position, or a combination thereof.

In another respect, disclosed herein is a method for locating an emitter of a radio frequency (RF) signal, the method including: receiving the RF signal at a first sensor antenna, the first sensor antenna being located on a first sensing platform; receiving the RF signal at a second sensor antenna and at a third sensor antenna, the second and third sensor antennas being co-located in spaced relationship on a second sensing platform; measuring first time difference of arrival (TDOA) information for the RF signal between the first position and the second antenna sensors; measuring frequency difference of arrival (FDOA) information for the RF signal between the first antenna sensor and at least one of the second and third antenna sensors; measuring second TDOA information for the RF signal between the second antenna sensor and the third antenna sensor, or measuring third TDOA information for the RF signal between the first antenna sensor and the third antenna sensor, or a combination thereof; and determining a location of the RF signal emitter based at least in part on an intersection of data determined from the first measured TDOA information with data determined from the measured FDOA information and with at least one of data determined from the second TDOA information, data determined from the third TDOA information, or a combination thereof.

In another respect, disclosed herein is an emitter location system, including: a first sensing platform configured to receive electromagnetic radiation at a first position on the first sensing platform, the first sensing platform including signal processing circuitry configured to process electromagnetic radiation received at the first position on the first sensing platform on a time and frequency basis; a second sensing platform configured to receive electromagnetic radiation at a second position on the second sensing platform and at a third position on the second sensing platform, the second and third positions being co-located in spaced relationship on the second sensing platform, and the second sensing platform including signal processing circuitry configured to process electromagnetic radiation received at the first and second positions on the second sensing platform on a time and frequency basis; and time difference of arrival (TDOA) processing circuitry configured to communicate with the signal processing circuitry of the first sensing platform and the signal processing circuitry of the second sensing platform.

In yet another respect, disclosed herein is a sensing system, including: a sensing platform configured to receive electromagnetic radiation at first and second positions on the sensing platform, the first and second positions being co-located in spaced relationship on the sensing platform; and signal processing circuitry configured to process the electromagnetic radiation received at the first and second positions on a time basis, and further configured to communicate with time difference of arrival (TDOA) processing circuitry processing circuitry of the second sensing platform.

In yet another respect, disclosed herein is a method of processing electromagnetic radiation, including: receiving the electromagnetic radiation at a first position and at a second position, the first and second positions being co-located in spaced relationship on a first sensing platform; and at least one of: measuring time difference of arrival (TDOA) information for the electromagnetic radiation between the first position and the second position, or receiving the electromagnetic radiation at a third position, the third position being located on a second sensing platform, and measuring TDOA information for the electromagnetic radiation between the first position and the third position, or receiving the electromagnetic radiation at a third position, the third position being located on a second sensing platform, and measuring TDOA information for the electromagnetic radiation between the second position and the third position, or a combination thereof.

DESCRIPTION OF ILLUSTRATIVE EMBODIMENTS

Figure 1:
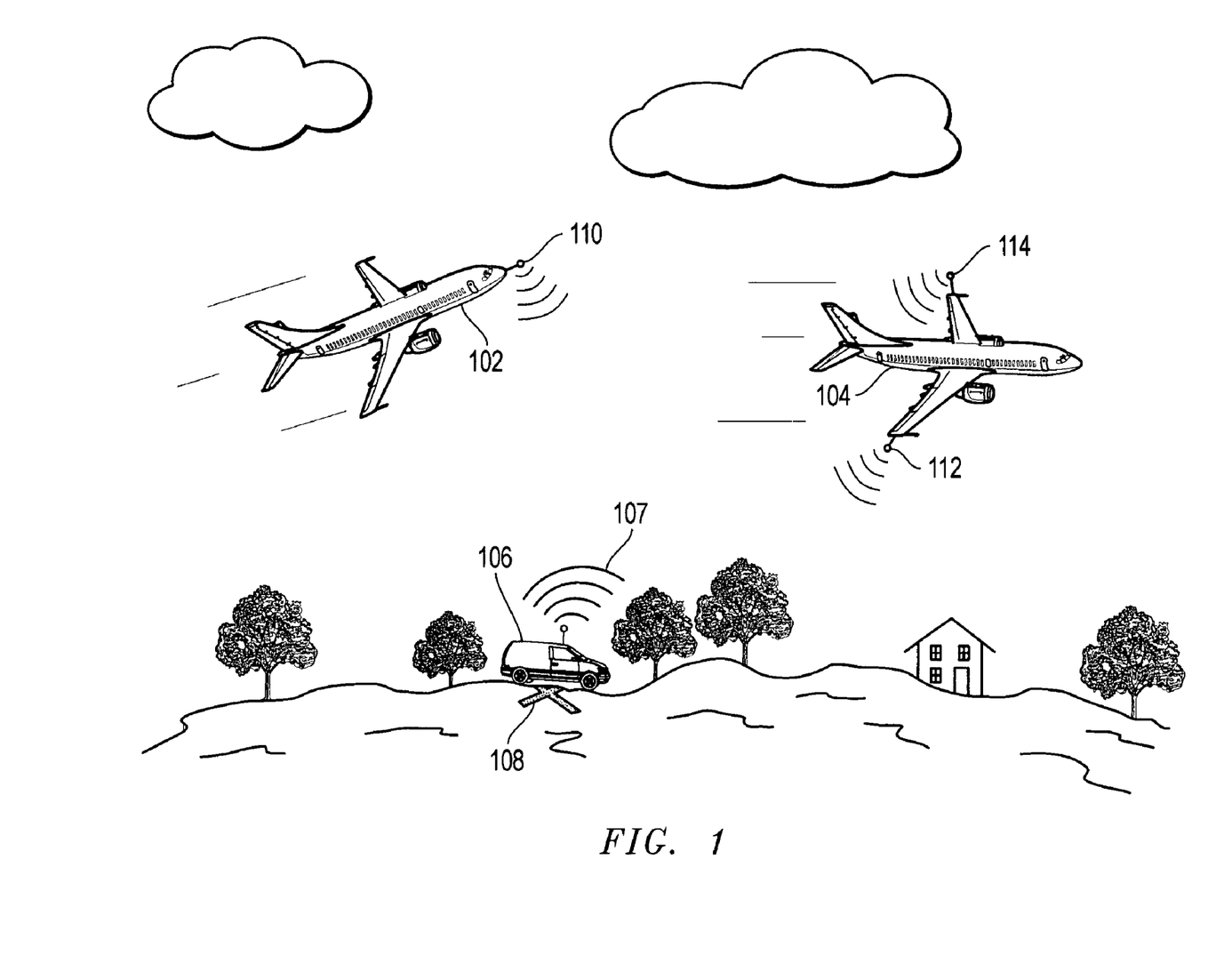
FIG. 1 is a simplified illustration of components of one exemplary embodiment of the disclosed systems and methods as they may be implemented to determine the geo-location of an electromagnetic radiation emitter.

FIG. 1 is a simplified illustration of one embodiment of the disclosed systems and methods as it may be implemented to determine the geo-location of an electromagnetic radiation emitter in the form of an earth-based RF emitter 106. In the illustrated embodiment, RF emitter 106 is shown transmitting a RF signal 107 in a relatively short burst (e.g., RF transmission time of less than or equal to about two seconds) from a given geo-location 108 marked by a "X" in FIG. 1. In the illustrated embodiment, earth-based RF emitter 106 is shown as a single mobile emitter that may be stationary or moving at the time of transmission of the RF signal. However, it is also possible RF emitter may be a stationary (e.g., permanently positioned) emitter, and/or that multiple RF emitters may be present.

The disclosed systems and methods may be employed to locate any type of mobile or stationary device that is suitable for emitting electromagnetic radiation having a signal strength that is detectable by sensors configured in a manner as described further herein. Such sensors may be any device configured to receive electromagnetic radiation signals emitted by an electromagnetic radiation emission source. In one exemplary embodiment, such sensors may be configured to sense electromagnetic radiation signals emitted within a wavelength that ranges from the visible light spectrum at the high end to the radio frequency (RF) spectrum at the low end. Examples of electromagnetic radiation emitters that may be located in the practiced of the disclosed systems and methods include, but are not limited to, mobile or stationary RF signal transmitters, mobile or stationary cell phone devices, mobile or stationary radar signal sources, mobile or stationary microwave sources, mobile or stationary visible light sources, etc. Examples of suitable sensor devices include any device capable of sensing the particular electromagnetic radiation emitted by the electromagnetic radiation emitter of interest, e.g., RF antennas for sensing RF emissions, optical sensors for sensing visible light emissions, etc.

Possible applications for the disclosed systems and methods include, but are not limited to, location of RF signal emitters in emergency situations (e.g., to locate lost ships, vehicles or personnel having an emergency RF signal emitter or transmitting via cell phone), location of RF signal emitters in law enforcement situations (e.g., to locate or track personnel or stolen property tagged with a RF signal emitter or transmitting via cell phone), location of RF signal emitters in wildlife management situations (e.g., to locate or track animals tagged with a RF signal emitter), etc.

FIG. 1 also illustrates two mobile sensing platforms in the form of fixed wing aircraft 102 and fixed wing aircraft 104 that are traveling at different speeds and headings relative to RF emitter 106, and that are each within reception range of RF signal 107 being transmitted by RF emitter 106. Aircraft 102 includes a single RF sensor antenna 110 that may be located in the nose (as illustrated), or at any other position on aircraft 102 that is suitable for receiving RF signal 107. Aircraft 104 includes two RF sensor antennas that are co-located on aircraft 104. As shown, the respective sensor antennas 112 and 114 of these co-located RF sensors are positioned on aircraft 104 in separate and spaced-apart relationship to each other to provide independent RF signal paths from RF emitter 106 to each sensor antenna.

Although FIG. 1 illustrates two mobile sensing platforms, it will be understood that the disclosed systems and methods may be implemented using one or more stationary sensing platforms (e.g., either sensing platform 102 and/or sensing platform 104 of FIG. 1 may be stationary), and that at least one of the stationary platforms may have co-located sensors. Such a stationary sensing platform configuration may be implemented, for example, for determining the location of a moving emitter of electromagnetic radiation. For example, one or more sensing platforms may be cell phone towers (e.g., at least one of which has co-located sensors) that are employed in a system to determine the location of moving cell phone transmission emitters.

In the illustrated exemplary embodiment of FIG. 1, sensor antennas 112 and 114 are shown positioned on opposite wing tips of aircraft 104 to achieve a spaced-apart relationship that is substantially equal to the wing span of the aircraft. However, it will be understood that two or more sensor antennas of two or more respective co-located electromagnetic radiation sensor antennas of a single sensing platform may be positioned in any spaced apart locations on a common sensing platform that provide independent signal paths from an emitter to each respective antenna that are suitable for producing a measurable difference in time of arrival of the emitter signal between the sensor antenna of the two or more co-located RF sensors. For example sensor antennas 112 and 114 of FIG. 1 may be alternatively positioned at the nose and tail of aircraft 104, at the nose and at one wing tip of aircraft 104, at midpoints in each wing of aircraft 104, etc.

It will be understood that for a given application, greater relative sensor spacing may be desirable. Referring to FIG. 1, sensor antennas may be spaced apart in one exemplary embodiment by a distance of greater than or equal to about 20 feet, although other any other spacing distance suitable for producing a measurable difference in time of arrival (TDOA) of an emitter signal between the two sensor antennas may be employed, including spacing of less than about 20 feet. In this regard, it will be understood that sensor spacing and sensor location in space relative to an emitter of electromagnetic radiation effect the performance characteristics of an emitter location system. Furthermore, minimum desirable sensor spacing is driven by the precision in which the sensor antennas can resolve a time difference of arrival. For example, sensors that operate from a single master clock source may be deterministic in their synchronization, e.g., into the single digit picosecond range. In one exemplary embodiment, sensor antenna synchronization may be employed that is less than or equal to about 10 picoseconds, alternatively from about 1 picosecond to about 10 picoseconds, and further alternatively from about 5 picoseconds to about 10 picoseconds. Such synchronization range capability may be coupled with non-colinear sensor spacing of greater than or equal to about twenty feet in the embodiment of FIG. 1 to provide enough data to substantially resolve mathematical ambiguities in TDOA/FDOA data between fixed wing aircraft 102 and fixed wing aircraft 104.

Although manned aircraft are illustrated as mobile sensing platforms in FIG. 1, a mobile sensing platform may be any other type of vehicle or movable device that is suitable for containing or otherwise supporting one or more RF sensors and moving relative to an RF emitter and to other mobile sensing platforms in a manner that allows determination of emitter geo-location in the manner described herein. Examples of other types of mobile sensing platforms include, but are not limited to, other types of aerial vehicles (e.g., unmanned aerial vehicles (UAVs), helicopters, etc.), space vehicles (e.g., satellites, missiles, etc.), surface vehicles (e.g., submarines, boats, trains, cars, trucks, etc.), etc.

Still referring to FIG. 1, the TDOA between sensing platforms 102 and 104 of RF signal 107 emitted by RF emitter 106 may be employed to define a hyperboloid upon which RF emitter 106 is located, and FDOA between sensing platforms 102 and 104 of RF signal 107 may be used to further resolve the geo-location of RF emitter 106. Assuming that RF emitter 106 is located on the surface of the earth, the intersection of the TDOA hyperboloid, the FDOA surface, and the surface of the earth may be employed to yield a set of geo-locations. One of these geo-locations is real, with the other geo-locations in the set being purely mathematical solutions that are not the real location of RF emitter 106.

Figure 2:
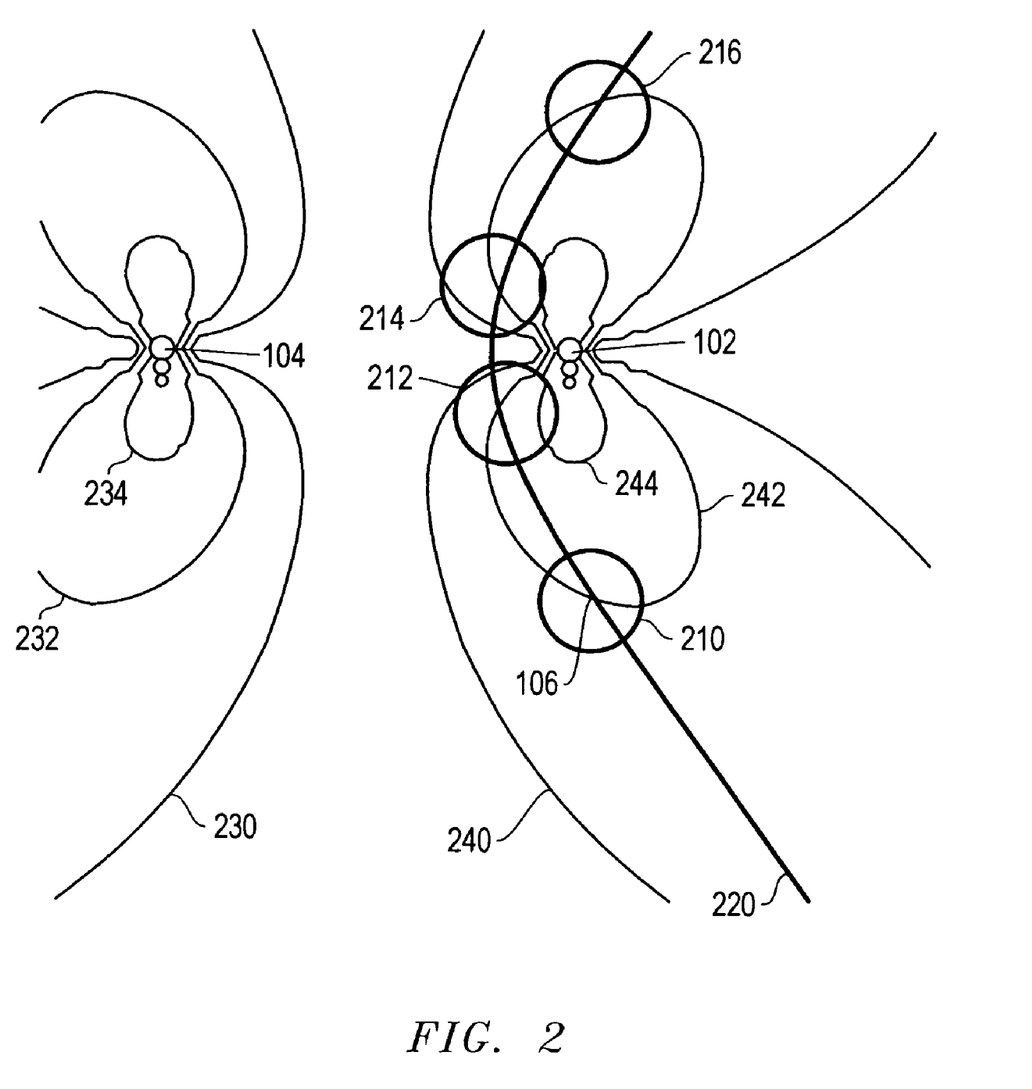
FIG. 2 represents TDOA/FDOA information gathered according to one exemplary embodiment of the disclosed systems and methods.

To illustrate, FIG. 2 represents TDOA/FDOA information for RF signal 107 of RF emitter 106 that has been gathered from sensor antenna 110 of sensing platform 102 and single sensor antenna 112 of sensing platform 104 of FIG. 1. FIG. 2 indicates the location of each sensing platform 102 and 104 as a large bubble having two adjacent smaller bubbles positioned adjacent thereto. These smaller bubbles are present to indicate the direction of flight for the aircraft of each sensing platform 102 and 104 by marking positions that trail behind the actual location of the moving aircraft. As previously described, aircraft 102 and 104 are flying at different velocities and headings in order to produce the FDOA data shown. The geo-location of RF emitter 106 is represented by the diamond-shaped indicator in FIG. 2.

As shown in FIG. 2, a single TDOA intersection line 220 is defined by the intersection between the surface of the earth and a TDOA hyperboloid obtained from sensor antennas 110 and 112, and thus RF emitter 106 is located somewhere along this line. A first set of FDOA intersection loops (230, 232 and 234) and a second set of FDOA intersection loops (240, 242 and 244) are defined by the intersection between the surface of the earth and FDOA surfaces obtained from sensor antennas 110 and 112. In this example, the second FDOA loop outward from each sensing platform represents the FDOA answer. As shown, in this example there are four intersections between TDOA line 220 and second FDOA loop 242, shown inside circles 210, 212, 214 and 216, that represent four possible geo-locations for RF emitter 106. Each one of these four intersections is a valid mathematical answer but, as shown, only one is the actual geo-location of RF emitter 106. Additional information is therefore needed in order to uniquely solve for the actual geo-location of RF emitter 106. As previously described, this additional information has in the past been taken from a system that can produce a line of bearing, or has been taken from a RF sensor mounted on a third aircraft.

Figure 3:
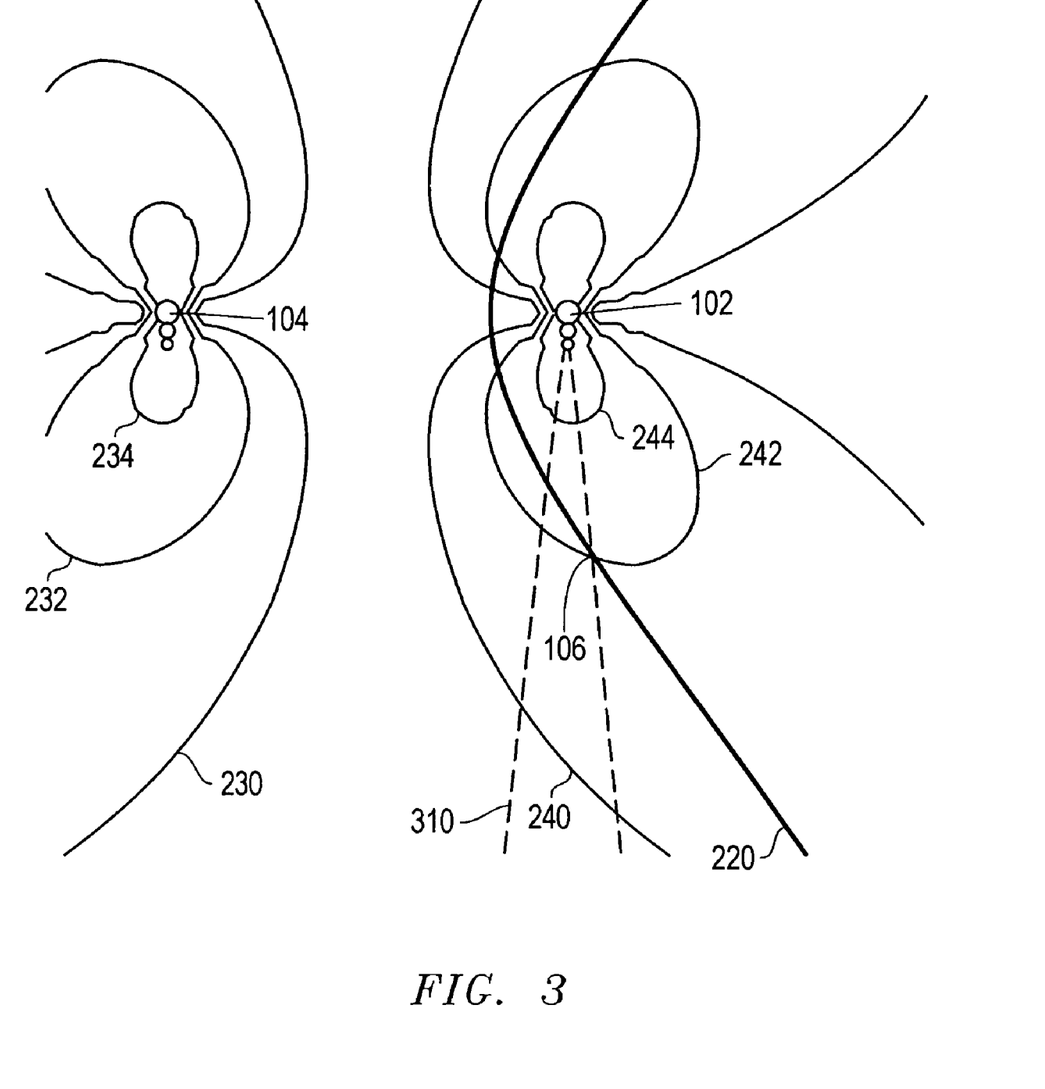
FIG. 3 represents TDOA/FDOA information gathered according to one exemplary embodiment of the disclosed systems and methods.

FIG. 3 represents a combination of TDOA/FDOA information for RF signal 107 of RF emitter 106 that has been gathered from sensor antenna 110 of sensing platform 102 and both sensor antennas 112 and 114 of sensing platform 104 of FIG. 1. In this regard, FIG. 3 includes a first TDOA intersection line 220 and both sets of FDOA intersection loops (230, 232, 234 and 240, 242, 244) that may be generated using information obtained for RF signal 107 from sensor antennas 110 and 112 in a manner as previously described in relation to FIG. 2. In the illustrated embodiment, TDOA for RF signal 107 measured between co-located receiving antennas 112 and 114 of sensing platform 104 may be used to define a second TDOA hyperboloid. As shown, a second TDOA intersection line 310 that is independent of first TDOA intersection line 220 may then be defined by the intersection between the surface of the earth and the second TDOA hyperboloid obtained from sensor antennas 112 and 114, with RF emitter 106 being located somewhere along this second TDOA intersection line. As shown, second TDOA intersection line 310 obtained from sensor antennas 112 and 114 intersects with first TDOA intersection line 220 obtained from sensor antennas 110 and 112 and with FDOA intersection loop 242 obtained from sensor antennas 110 and 112 at the actual geo-location of RF sensor 106, thus locating RF sensor 106 by resolving the mathematical ambiguities of the data in FIG. 2 using information gathered from two sensing platforms. Advantageously this may be accomplished without the cost of a third sensing platform, the cost of line of bearing equipment, and without the need for RF emitter 106 to remain active for an extended period of time.

With regard to FIG. 3, it will be understood that TDOA for RF signal 107 measured between receiving antennas 110 and 114 of sensing platform 104 may be optionally used to define a third TDOA hyperboloid, and a third TDOA intersection line (not shown) that is independent of first and second TDOA intersection lines 220 and 310 may then be defined by the intersection between the surface of the earth and the third TDOA hyperboloid obtained from sensor antennas 110 and 114, with RF emitter 106 being located somewhere along this third TDOA intersection line. Such a third TDOA intersection line obtained from sensor antennas 110 and 114 intersects with first and second TDOA intersection lines 220 and 310 and with FDOA intersection loop 242 at the actual geo-location of RF sensor 106.

For purposes of simplicity, TDOA and FDOA intersection lines have been depicted in FIGS. 2 and 3 that result from the intersection of respective TDOA hyperboloid and FDOA surface with a surface of the earth that is modeled as a flat plane. However, it will be understood that the intersection between TDOA hyperboloid and FDOA surface and the earth may produce a complex contour under those conditions where the surface of the earth is not a flat plane, e.g., due to the presence of hills and valleys, etc.

Although FIG. 3 illustrates an embodiment where TDOA/FDOA information is gathered from co-located sensors to determine the location of an electromagnetic radiation emitter, it will be understood that it is possible in another embodiment to gather only TDOA information from co-located sensors and, where geometry allows, to determine the location of an electromagnetic radiation emitter using only this gathered TDOA information.

In the practice of the disclosed systems and methods, a single sensing platform may be configured with two or more co-located sensor antennas in any manner suitable for measuring TDOA information for an emitter signal, and generating a second TDOA intersection line therefrom. However, it will be understood that the precision of the second TDOA intersection line may be improved if so desired by configuring the co-located sensor antennas on a common sensing platform so that the separation between the co-located sensor antennas is very well defined. This may be done, for example, by precisely measuring and calibrating the separation between the co-located sensor antennas for use in the TDOA hyperboloid calculations.

Additionally or alternatively, sensor circuitry coupled to each of the co-located sensor antennas may be configured to utilize identical timing signals to produce a coherent collection of the RF signal, and this timing may be calibrated and maintained constant during the collection of TDOA information from the two sensors. In this regard, the precision of timing possible between separate sensor circuitry coupled to co-located sensor antennas may be greatly improved over the precision of timing that is possible between separate sensor circuitry couple to sensor antennas located on separate aircraft. Thus, sufficient precision may be achieved to produce a set of TDOA hyperboloid data from multiple sensor antennas that are co-located on a common sensing platform (e.g., aircraft) that is accurate enough to resolve the ambiguities in TDOA hyperboloid/FDOA surface data determined from two separate sensor antennas located on separate sensing platforms (e.g., on separate aircraft). In one exemplary embodiment, difference in timing between separate sensor circuitry coupled to co-located sensor antennas may be maintained at less than or equal to about ten picoseconds, although it is possible that difference in timing may be greater in some embodiments.

Figure 4:
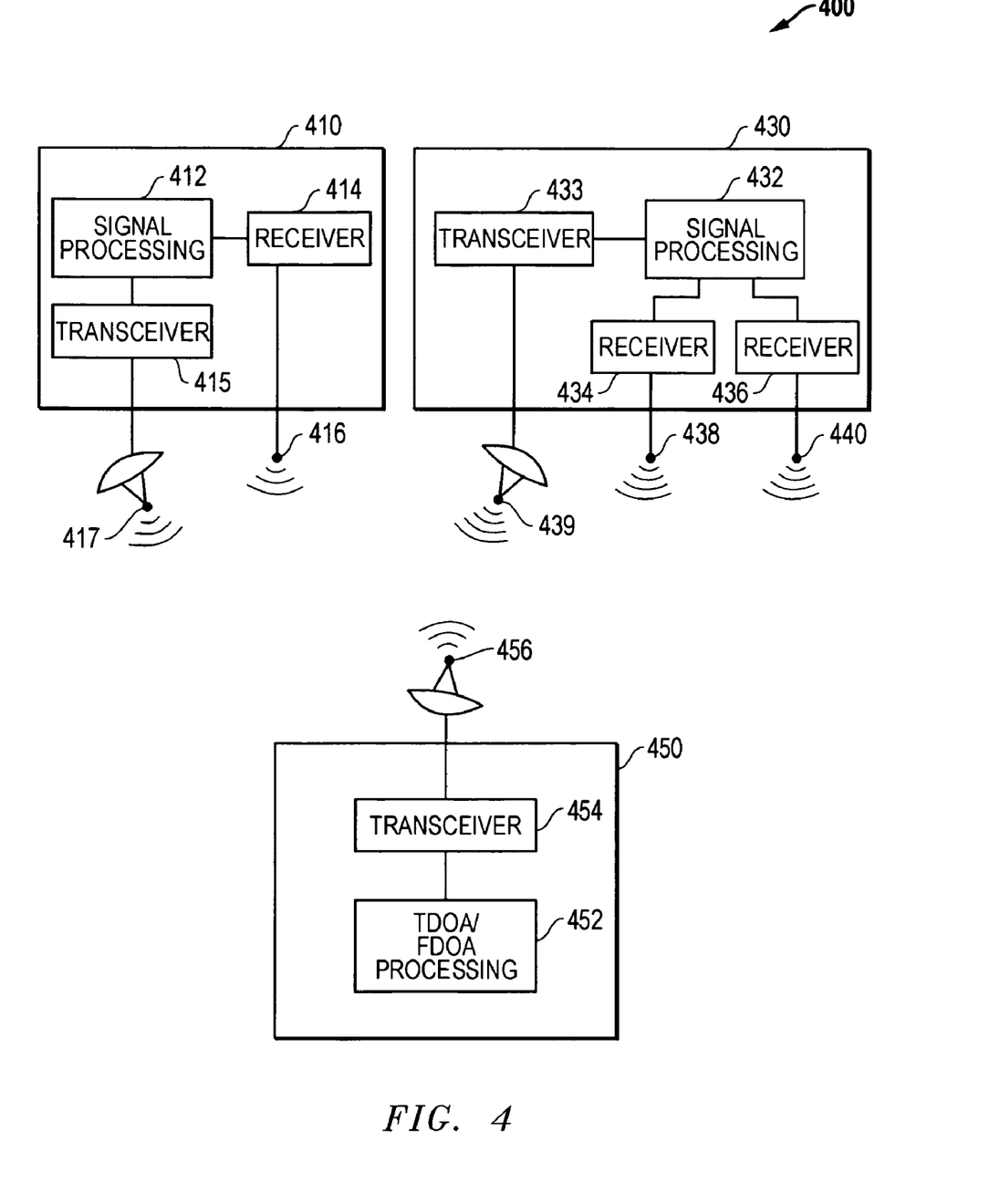
FIG. 4 illustrates a simplified block diagram of an emitter location system according to one exemplary embodiment of the disclosed systems and methods.

FIG. 4 illustrates a simplified block diagram of an emitter location system 400 that includes a first sensing platform 410, a second sensing platform 430, and an optional processing platform 450 as these components may be implemented in one embodiment of the disclosed systems and methods. In one exemplary embodiment, first sensing platform 410 may correspond to sensing platform 102 of FIG. 1, second sensing platform 430 may correspond to sensing platform 104 FIG. 1, and optional processing platform 450 may be a stationary or mobile earth-based processing station positioned within wireless signal communication range of platforms 410 and 430. Although illustrated in FIG. 4 as a separate processing platform, it will be understood that components and functionality of optional processing platform 450 may alternatively be located on first and/or second sensing platforms 410 and 430. It will also be understood that an optional processing platform may be provided as a separate processing platform configured for operation in any suitable location and/or environment, e.g., configured as a separate airborne processing platform, ship-based platform, space-based platform, etc.

Sensing platform 410 of FIG. 4 is shown provided with a sensor antenna 416 that is coupled to signal processing circuitry 412 via receiver 414, and sensing platform 430 is shown provided with co-located sensor antennas 438 and 440 that are coupled to signal processing circuitry 432 via respective receivers 434 and 436. In the illustrated embodiment, sensor antennas 416, 438 and 440 are each provided with respective receivers 414, 434 and 436 to receive signals transmitted by an electromagnetic radiation emitter (e.g., RF emitter 106 of FIG. 1) in a manner as previously described. Receiver 414 is in turn configured to provide signals received by sensor antenna 416 to signal processing circuitry 412, and each of receivers 434 and 436 are in turn configured to provide signals received by respective sensor antennas 438 and 440 to signal processing circuitry 432. In this regard, each of signal processing circuitry 412 and 432 may include a digital signal processor ("DSP") and/or any combination of circuit components (e.g., processor/s, microprocessor/s, volatile or non-volatile memory, etc.) suitable for processing received emitter signals on a time and frequency basis (e.g., time measurement/tagging of received emitter signals, frequency measurement of received emitter signals, etc.) suitable for further use in determining TDOA and FDOA in a manner as described elsewhere herein. Signal processing circuitry 432 may be further configured to control timing difference between receivers 434 and 436 in order to maintain sufficient timing precision to allow determination of the TDOA of a signal between sensor antennas 438 and 440.

Still referring to the exemplary embodiment of FIG. 4, sensing platform 410 is shown provided with a communication antenna 417 that is coupled to signal processing circuitry 412 via transceiver 415, and sensing platform 430 is shown provided with a communication antenna 439 that is coupled to signal processing circuitry 432 via transceiver 433. In such a configuration, transceiver 415 may be provided to transmit processed emitter signal information from signal processing circuitry 412 to a separate TDOA/FDOA processing platform (e.g., such as optional processing platform 450) via communication antenna 417. Transceiver 415 may also be configured to provide control signals or other information to signal processing circuitry 412 that is received from a separate TDOA/FDOA processing platform via communication antenna 417. Likewise, transceiver 433 may be provided to communicate processed received emitter signal information from signal processing circuitry 432 to a separate TDOA/FDOA processing platform via communication antenna 439. Transceiver 433 may also be configured to provide control signals or other information to signal processing circuitry 432 that is received from a separate TDOA/FDOA processing platform via communication antenna 439.

Optional processing platform 450 of FIG. 4 is shown provided with a communication antenna 456 that is coupled to TDOA/FDOA processing circuitry 452 via transceiver 454. In such a configuration, communication antenna 456 is provided to receive processed emitter signal information from each of sensing platforms 410 and 430 and to provide this information to TDOA/FDOA processing circuitry 452 for further processing, e.g., for generation of TDOA/FDOA data sets and determination of geo-location of an emitter using methodology described and illustrated herein in relation to FIGS. 2 and 3. Transceiver 454 may also be configured to transmit control signals or other information from TDOA/FDOA processing circuitry 452 to sensing platforms 410 and 430 via communication antenna 456.

Figure 5:
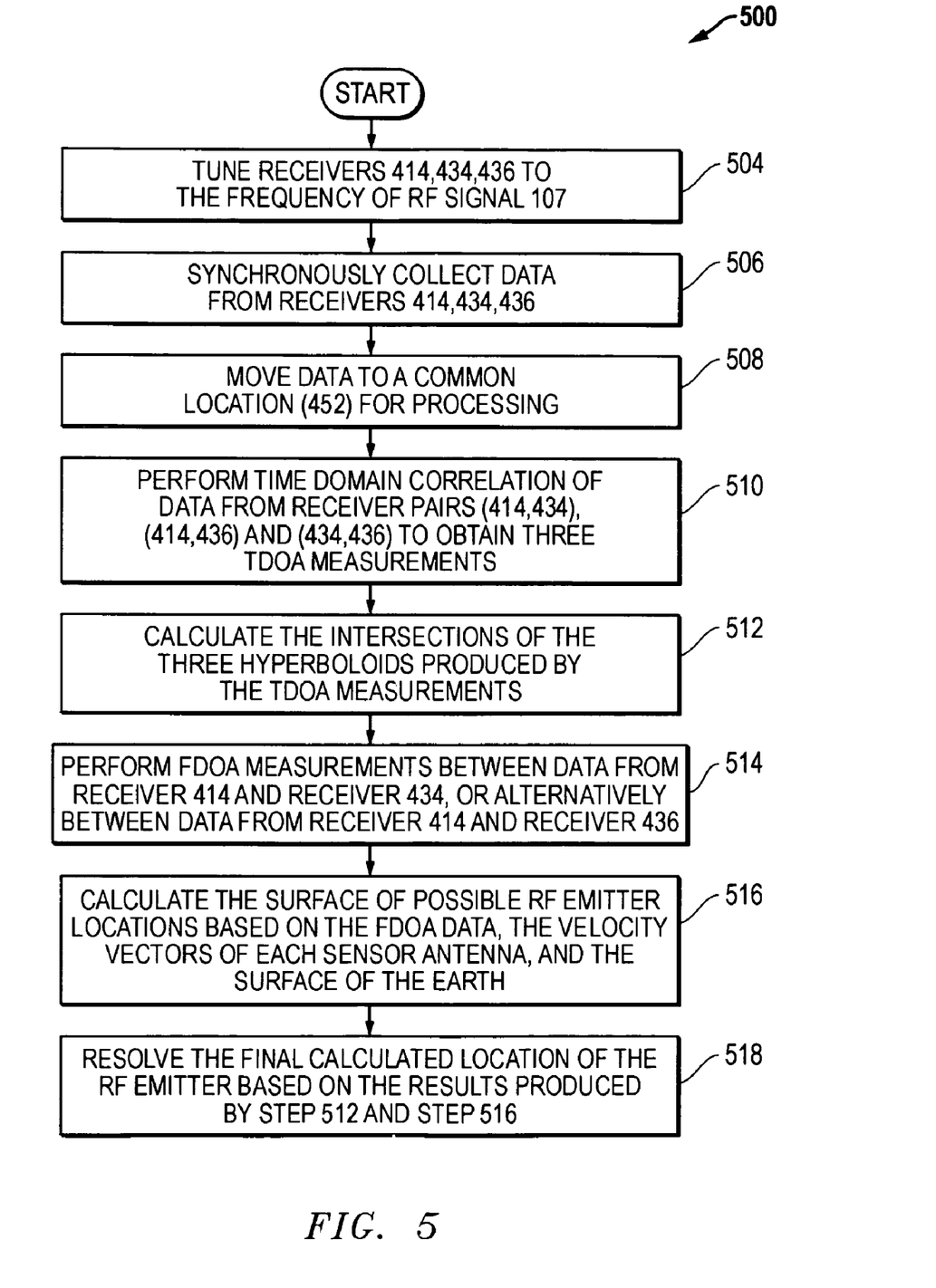
FIG. 5 illustrates an emitter location method according to one exemplary embodiment of the disclosed systems and methods.

FIG. 5 illustrates one exemplary embodiment of a method 500 which may be implemented using the emitter location system 400 of FIG. 4 to determine the -location of an electromagnetic radiation emitter. As shown in FIG. 5, method 500 starts in step 502, and in step 504 receivers 414, 434 and 436 are tuned to the frequency of an RF signal, such as RF signal 107 transmitted by RF emitter 106 of FIG. 1. Next, in step 506 data is synchronously collected from receivers 414, 434 and 436 of sensing platforms 410 and 430, and then is provided in step 508 to TDOA/FDOA processing circuitry 452 for further processing in step 510. In the illustrated embodiment, such further processing includes performance of time domain correlation of data from three receiver pairs (414, 434), (414, 436) and (434, 436) to obtain three TDOA measurements, although it is also possible that time domain correlation of data from two receiver pairs may alternatively be performed to obtain two TDOA measurements. Next, in step 512 the intersections of the three hyperboloids produced by the TDOA measurements of step 510 is calculated.

In step 514 of method 500, FDOA measurements are performed on data between receiver 414 and receiver 434, and/or on data between receiver 414 and receiver 436. In step 516, the surface of possible locations of RF emitter 106 is calculated based on the FDOA data of step 514, the velocity vectors of each sensor antenna, and the surface of the earth. Finally, the location of RF emitter 106 is resolved based on the results of steps 512 and 516.

It will be understood that the illustrated order of steps of method 500 is exemplary only, and the order of the illustrated steps may be varied to any other order that is suitable for determining the location of an electromagnetic radiation emitter, e.g., individual TDOA and FDOA calculations/processing may be performed in any suitable alternative order. Further, it is possible that additional, alternative or fewer steps may be implemented in any other manner that is suitable for determining the location of an electromagnetic radiation emitter using at least two electromagnetic radiation sensors co-located on a single sensing platform in combination with at least one other electromagnetic radiation sensor on another sensing platform. In addition, any suitable TDOA/FDOA algorithm may be employed in the practice of the disclosed systems and methods, for example, as described in "Positioning Using Time-Difference of Arrival Measurements" by Fredrik Gustafsson and Fredrik Gunnarsson, Department of Electrical Engineering, Linköping University, Linköping, Sweden, which is incorporated herein by reference.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method of processing electromagnetic radiation, comprising:

receiving said electromagnetic radiation at a first position, said first position being located on a first sensing platform;

receiving said electromagnetic radiation at a second position and at a third position, said second and third positions being co-located in spaced relationship on a second sensing platform;

measuring first time difference of arrival (TDOA) information for said electromagnetic radiation between said first position and said second position;

measuring frequency difference of arrival (FDOA) information for said electromagnetic radiation between said first position and at least one of said second and third positions;

at least one of:
  measuring second TDOA information for said electromagnetic radiation between said second position and said third position, or
  measuring third TDOA information for said electromagnetic radiation between said first position and said third position, or
  a combination thereof; and determining a location of an emitter of said electromagnetic radiation based at least in part on an intersection of data determined from said first measured TDOA information with data determined, from said measured FDOA information and with at least one of data determined from said second TDOA information, data determined from said third TDOA information, or a combination thereof;

wherein said location of said emitter of said electromagnetic radiation is determined using data determined from TDOA and FDOA information measured while said first sensing platform and said second sensing platform are moving differently relative to each other and are moving relative to said emitter of said electromagnetic radiation;

wherein said location of said emitter of said electromagnetic radiation is determined without receiving said electromagnetic radiation at a position on a third sensing platform and without repositioning said first and second sensing platforms to new locations for measurement of additional TDOA or FDOA information.

2. The method of claim 1, further comprising:
defining a first hyperboloid using said first measured TDOA information;
defining a surface using said measured FDOA information;
defining a second hyperboloid using said second measured TDOA information, or defining a third hyperboloid using said third measured TDOA information, or a combination thereof; and
determining a location of said earth-based emitter of said electromagnetic radiation based on an intersection point of said surface of the earth with said first hyperboloid, said surface, and at least one of said second or third hyperboloids.

3. The method of claim 1, wherein said first sensing platform is a first aircraft; wherein said second sensing platform is a second aircraft; wherein said first aircraft is moving at a first heading and first velocity relative to the emitter of the electromagnetic radiation; wherein said second aircraft is moving at a second heading and second velocity relative to the emitter of the electromagnetic radiation; and wherein said first heading is different from said second heading and said first velocity is different from said second velocity such that said first aircraft and said second aircraft are moving differently relative to each other while said TDOA and FDOA information is measured.

4. The method of claim 1, wherein said emitter of said electromagnetic radiation is earth-based; wherein said first sensing platform is a first aircraft; and wherein said second sensing platform is a second aircraft.

5. A method for locating an emitter of a radio frequency (RF) signal, said method comprising:
receiving said RF signal at a first sensor antenna, said first sensor antenna being located on a first sensing platform;
receiving said RF signal at a second sensor antenna and at a third sensor antenna, said second and third sensor antennas being co-located in spaced relationship on a second sensing platform;
measuring first time difference of arrival (TDOA) information for said RF signal between said first position and said second antenna sensors;
measuring frequency difference of arrival (FDOA) information for said RF signal between said first antenna sensor and at least one of said second and third antenna sensors;
measuring second TDOA information for said RF signal between said second antenna sensor and said third antenna sensor, or measuring third TDOA information for said RF signal between said first antenna sensor and said third antenna sensor, or a combination thereof; and
determining a location of said RF signal emitter based at least in part on an intersection of data determined from said first measured TDOA information with data determined from said measured FDOA information and with at least one of data determined from said second TDOA information, data determined from said third TDOA information, or a combination thereof;

wherein said location of said RF signal emitter of said electromagnetic radiation is determined using data determined from TDOA and FDOA information measured while said first sensing platform and said second sensing platform are moving differently relative to each other and are moving relative to said RF signal emitter of said electromagnetic radiation; and wherein said location of said RF signal emitter is determined without receiving said RF signal at a sensor antenna on a third sensing platform, and without repositioning said first and second sensing platforms to new locations for measurement of additional TDOA or FDOA information.

6. The method of claim 5, wherein said first sensing platform is moving at a first velocity and first heading relative to said RF signal emitter; wherein said second sensing platform is moving at a second velocity and second heading relative to said RF signal emitter; and wherein said first velocity is different from said second velocity and said first heading is different from said second heading such that said first sensing platform and said second sensing platform are moving differently relative to each other while said TDOA and FDOA information is measured.

7. The method of claim 5, wherein said RE signal emitter is earth-based and wherein said method further comprises:
defining a first hyperboloid using said first measured TDOA information;
defining a surface using said measured FDOA information;
defining a second hyperboloid using said second measured TDOA information, or defining a third hyperboloid using said third measured TDOA information, or a combination thereof; and
determining a geo-location of said RF signal emitter based on an intersection point of said surface of the earth with said first hyperboloid, said surface, and at least one of said second or third hyperboloids.

8. The method of claim 7, wherein said first and second sensing platforms are each aircraft.

9. The method of claim 7, wherein said first and second sensing platforms are each satellites in earth orbit.

10. The method of claim 7, wherein said RF signal emitter comprises a cell phone.

11. The method of claim 10, wherein said first and second sensing platforms are each satellites in earth orbit.

12. An emitter location system, comprising:
a first sensing platform configured to receive electromagnetic radiation at a first position on said first sensing platform, said first sensing platform comprising signal processing circuitry configured to process electromagnetic radiation received at said first position on said first sensing platform on a time and frequency basis;
a second sensing platform configured to receive electromagnetic radiation at a second position on said second sensing platform and at a third position on said second sensing platform, said second and third positions being co-located in spaced relationship on said second sensing platform, and said second sensing platform comprising signal processing circuitry configured to process electromagnetic radiation received at said second and third positions on said second sensing platform on a time and frequency basis;

time difference of arrival (TDOA) processing circuitry configured to communicate with said signal processing circuitry of said first sensing platform and said signal processing circuitry of said second sensing platform; and frequency difference of arrival (FDOA) processing circuitry configured to communicate with said signal processing circuitry of said first sensing platform and said signal processing circuitry of said second sensing platform, said TDOA and FDOA processing circuitry being configured to:

measure first TDOA information for said electromagnetic radiation between said first position and said second position, measure FDOA information for said electromagnetic radiation between said first position and at least one of said second or third positions, measure second TDOA information for said electromagnetic radiation between said second position and said third position, or measure third TDOA information for said electromagnetic radiation between said first position and said third position, or a combination thereof, and determine a location of an emitter of said electromagnetic radiation based at least in part on an intersection of data determined from said first measured TDOA information with data determined from said measured FDOA information and with data determined from at least one of said second TDOA information, said third TDOA information, or a combination thereof;

wherein said TDOA and FDOA processing circuitry are further configured to determine said location of said emitter of said electromagnetic radiation using data determined from TDOA and FDOA information measured while said first sensing platform and said second sensing platform are moving differently relative to each other and are moving relative to an emitter of said electromagnetic radiation;

wherein said TDOA and FDOA processing circuitry are further configured to determine said location of said emitter of said electromagnetic radiation without receiving said electromagnetic radiation at a sensor on a third sensing platform, and without repositioning said first and second sensing platforms to new locations for measurement of additional TDOA or FDOA information.

13. The system of claim 12, wherein said TDOA and FDOA processing circuitry is configured to:

define a first hyperboloid using said first measured TDOA information;

define a surface using said measured FDOA information;

define a second hyperboloid using said second measured TDOA information, or define a third hyperboloid using said third measured TDOA information, or a combination thereof; and determine a geo-location of an earth-based emitter of said electromagnetic radiation based on an intersection point of the surface of the earth with said first hyperboloid, said surface, and at least one of said second hyperboloid, said third hyperboloid, or a combination thereof.

14. The system of claim 12, wherein said first and second sensing platforms are each aircraft; wherein said electromagnetic radiation comprises a radio frequency (RF) signal; wherein said first sensing platform comprises a first sensor antenna at said first position, said first sensor antenna being coupled to said signal processing circuitry of said first sensing platform; and wherein said second sensing platform comprises a second sensor antenna at said second position and a third sensor antenna at said third position, said second sensor antenna and said third sensor antenna being coupled to said signal processing circuitry of said second sensing platform.

15. The system of claim 12, wherein said first and second sensing platforms are each satellites.

* * * * *

UNITED STATES PATENT AND TRADEMARK OFFICE
CERTIFICATE OF CORRECTION

PATENT NO. : 7,508,344 B2 Page 1 of 1
APPLICATION NO. : 11/288975
DATED : March 24, 2009
INVENTOR(S) : Ken Stroud It is certified that error appears in the above-identified patent and that said Letters Patent is hereby corrected as shown below:

In claim 7, column 12, line 33, delete "RE" and insert --RF--.

Signed and Sealed this

Twelfth Day of May, 2009

JOHN DOLL
*Acting Director of the United States Patent and Trademark Office*